(12) United States Patent
Sun et al.

(10) Patent No.: US 10,196,728 B2
(45) Date of Patent: Feb. 5, 2019

(54) PLASMA SPRAY COATING DESIGN USING PHASE AND STRESS CONTROL

(71) Applicant: Applied Materials, Inc., Santa Clara, CA (US)

(72) Inventors: Jennifer Y. Sun, Mountain View, CA (US); Yikai Chen, Santa Clara, CA (US); Biraja Prasad Kanungo, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 128 days.

(21) Appl. No.: 14/712,054

(22) Filed: May 14, 2015

(65) Prior Publication Data
US 2015/0329955 A1 Nov. 19, 2015

Related U.S. Application Data

(60) Provisional application No. 61/994,648, filed on May 16, 2014.

(51) Int. Cl.
*C23C 4/11* (2016.01)
*C23C 4/134* (2016.01)
(Continued)

(52) U.S. Cl.
CPC .............. *C23C 4/134* (2016.01); *C04B 35/10* (2013.01); *C04B 35/48* (2013.01); *C04B 35/505* (2013.01); *C23C 4/11* (2016.01); *Y10T 428/26* (2015.01)

(58) Field of Classification Search
CPC ....... C04B 35/00; C04B 35/505; H01L 21/02; C23C 4/00; C23C 4/01; C23C 4/02;
(Continued)

(56) References Cited

U.S. PATENT DOCUMENTS

| 6,949,203 B2 | 9/2005 | Hsieh et al. |
| 7,479,464 B2 | 1/2009 | Sun et al. |

(Continued)

FOREIGN PATENT DOCUMENTS

| JP | 2014062332 | 4/2014 |
| JP | 2014122418 | 7/2014 |
| WO | 2015/175987 | 11/2015 |

OTHER PUBLICATIONS

Zircotec, "Plasma Spray Processing," Optimised performance in high-temperature environments; Plasma sprayed ceramic thermal coatings, http://www.zircotec.com/page/plasma-spray-processing/39, downloaded Apr. 4, 2014.

(Continued)

*Primary Examiner* — Dah-Wei D. Yuan
*Assistant Examiner* — Nga Leung V Law
(74) *Attorney, Agent, or Firm* — Lowenstein Sandler LLP

(57) ABSTRACT

To manufacture a coating for an article for a semiconductor processing chamber, the article including a body of at least one of Al, $Al_2O_3$, or SiC is provided and a ceramic coating is coated on the body, wherein the ceramic coating includes a compound of $Y_2O_3$, $Al_2O_3$, and $ZrO_2$. The ceramic coating is applied to the body by a method including providing a plasma spraying system having a plasma current in the range of between about 100 A to about 1000 A, positioning a torch standoff of the plasma spraying system a distance from the body between about 60 mm and about 250 mm, flowing a first gas through the plasma spraying system at a rate of between about 30 L/min and about 400 L/min, and plasma spray coating the body to form a ceramic coating, wherein splats of the coating are amorphous and have a pancake shape.

12 Claims, 6 Drawing Sheets

(51) Int. Cl.
*C04B 35/505* (2006.01)
*C04B 35/48* (2006.01)
*C04B 35/10* (2006.01)

(58) Field of Classification Search
CPC .... C23C 4/04; C23C 4/10; C23C 4/11; C23C 4/12; C23C 4/134
USPC ................................................ 427/446, 453
See application file for complete search history.

(56) References Cited

U.S. PATENT DOCUMENTS

| | | | |
|---|---|---|---|
| 7,655,328 B2 | 2/2010 | Maeda et al. | |
| 7,672,110 B2 | 3/2010 | Sun et al. | |
| 7,696,117 B2 | 4/2010 | Sun et al. | |
| 7,718,559 B2 | 5/2010 | Yuan et al. | |
| 7,968,205 B2 | 6/2011 | Nakano et al. | |
| 8,034,734 B2 | 10/2011 | Sun et al. | |
| 8,067,067 B2 | 11/2011 | Sun et al. | |
| 8,129,029 B2 | 3/2012 | Sun et al. | |
| 8,206,829 B2 | 6/2012 | Sun et al. | |
| 8,367,227 B2 | 2/2013 | Sun et al. | |
| 8,619,406 B2 | 12/2013 | Cho et al. | |
| 8,623,527 B2 | 1/2014 | Sun et al. | |
| 8,758,858 B2 | 6/2014 | Sun et al. | |
| 8,916,021 B2 | 12/2014 | Sun et al. | |
| 8,941,969 B2 | 1/2015 | Thach et al. | |
| 9,017,765 B2 | 4/2015 | Sun et al. | |
| 9,034,199 B2 | 5/2015 | Duan et al. | |
| 9,051,219 B2 | 6/2015 | Sun et al. | |
| 9,090,046 B2 | 7/2015 | Sun et al. | |
| 9,212,099 B2 | 12/2015 | Sun et al. | |
| 9,343,289 B2 | 5/2016 | Sun et al. | |
| 9,358,702 B2 | 6/2016 | Banda et al. | |
| 9,394,615 B2 | 7/2016 | Sun et al. | |
| 9,440,886 B2 | 9/2016 | Sun et al. | |
| 9,447,365 B2 | 9/2016 | Banda et al. | |
| 9,583,369 B2 | 2/2017 | Sun et al. | |
| 2003/0047464 A1 | 3/2003 | Sun et al. | |
| 2003/0110708 A1 | 6/2003 | Rosenflanz | |
| 2003/0164354 A1 | 9/2003 | Hsieh et al. | |
| 2004/0023078 A1* | 2/2004 | Rosenflanz | C03C 3/062 428/702 |
| 2005/0037193 A1* | 2/2005 | Sun | C23C 16/4404 428/332 |
| 2005/0084654 A1* | 4/2005 | Takahashi | C23C 4/02 428/143 |
| 2005/0089699 A1* | 4/2005 | Lin | C23C 14/564 428/457 |
| 2007/0047170 A1 | 3/2007 | Sun et al. | |
| 2008/0029032 A1 | 2/2008 | Sun et al. | |
| 2008/0108225 A1 | 5/2008 | Sun et al. | |
| 2008/0213496 A1* | 9/2008 | Sun | C23C 4/18 427/453 |
| 2008/0261800 A1 | 10/2008 | Yuan et al. | |
| 2008/0264564 A1 | 10/2008 | Sun et al. | |
| 2008/0264565 A1 | 10/2008 | Sun et al. | |
| 2009/0036292 A1 | 2/2009 | Sun et al. | |
| 2009/0162647 A1 | 6/2009 | Sun et al. | |
| 2009/0214825 A1 | 8/2009 | Sun et al. | |
| 2010/0119843 A1 | 5/2010 | Sun et al. | |
| 2010/0129670 A1 | 5/2010 | Sun et al. | |
| 2010/0160143 A1 | 6/2010 | Sun et al. | |
| 2011/0198034 A1 | 8/2011 | Sun et al. | |
| 2011/0210102 A1* | 9/2011 | Matsumoto | B23K 10/02 219/121.46 |
| 2012/0034469 A1 | 2/2012 | Sun et al. | |
| 2012/0104703 A1 | 5/2012 | Sun et al. | |
| 2012/0125488 A1 | 5/2012 | Sun et al. | |
| 2012/0196139 A1 | 8/2012 | Petorak et al. | |
| 2013/0216783 A1 | 8/2013 | Duan et al. | |
| 2013/0216821 A1 | 8/2013 | Sun et al. | |
| 2013/0224498 A1 | 8/2013 | Sun et al. | |
| 2013/0273313 A1 | 10/2013 | Sun et al. | |
| 2013/0273327 A1 | 10/2013 | Sun et al. | |
| 2013/0284373 A1 | 10/2013 | Sun et al. | |
| 2013/0288037 A1 | 10/2013 | Sun et al. | |
| 2014/0030486 A1 | 1/2014 | Sun et al. | |
| 2014/0030533 A1 | 1/2014 | Sun et al. | |
| 2014/0154465 A1 | 6/2014 | Sun et al. | |
| 2014/0308479 A1* | 10/2014 | Parakala | C23C 28/3455 428/155 |
| 2015/0064406 A1 | 3/2015 | Harada et al. | |
| 2015/0079370 A1 | 3/2015 | Sun et al. | |
| 2015/0152540 A1 | 6/2015 | Sato et al. | |
| 2015/0321964 A1 | 11/2015 | Sun et al. | |
| 2016/0016856 A1 | 1/2016 | Kitamura et al. | |
| 2017/0022595 A1 | 1/2017 | Sato et al. | |

OTHER PUBLICATIONS

Nakamura et al., "Effects of Pores on Mechanical Properties of Plasma-Sprayed Ceramic Coatings," J. Am. Ceram. Soc., 83 [3] 578-84, Mar. 2000.
Govindarajan et al., "In situ Particle Generation and Splat Formation During Solution Precursor Plasma Spraying of Yttria-Stabilized Zirconia Coatings," J Am. Ceram. Soc., 1-9 (2011).
"Thermal Spraying," definition, Wikipedia, http://en.wikipedia.org/wiki/Thermal_spraying, downloaded Apr. 14, 2014.
International Search Report and Written Opinion for PCT Application No. PCT/US2015/031172 dated Sep. 22, 2015.
Srinivasan, V., A Critical Assessment of In-flight Particle State During Plasma Spraying of YSZ and its Implications on Coating Properties and Process Reliability, Aug. 2007, 226 pgs., Stony Brook University.

* cited by examiner

US 10,196,728 B2

PLASMA SPRAY COATING DESIGN USING PHASE AND STRESS CONTROL

RELATED APPLICATIONS

This patent application claims the benefit under 35 U.S.C. § 119(e) of U.S. Provisional Application No. 61/994,648, filed May 16, 2014.

TECHNICAL FIELD

Embodiments of the present disclosure relate, in general, to ceramic coated articles and to a process for applying a ceramic coating to components.

BACKGROUND

In the semiconductor industry, devices are fabricated by a number of manufacturing processes producing structures of an ever-decreasing size. Some manufacturing processes such as plasma etch and plasma clean processes expose a substrate to a high-speed stream of plasma to etch or clean the substrate. The plasma may be highly corrosive, and may corrode processing chambers and other surfaces that are exposed to the plasma (e.g., exposed to a plasma environment). This corrosion may generate particles, which frequently contaminate the substrate that is being processed (e.g., semiconductor wafers). These on-wafer particles can contribute to device defects.

As device geometries shrink, susceptibility to defects increases and particle contaminant requirements become more stringent. Accordingly, as device geometries shrink, allowable levels of particle contamination may be reduced. To minimize particle contamination introduced by plasma etch and/or plasma clean processes, chamber materials have been developed that are resistant to plasmas. Different materials provide different material properties, such as plasma resistance, rigidity, flexural strength, thermal shock resistance, and so on. Also, different materials have different material costs. Accordingly, some materials have superior plasma resistance, other materials have lower costs, and still other materials have superior flexural strength and/or thermal shock resistance.

SUMMARY

In one embodiment an article includes a body comprising at least one of Al, $Al_2O_3$, AlN, $Y_2O_3$, YSZ, or SiC. The article further includes a plasma-sprayed ceramic coating on at least one surface of the body, the ceramic coating comprising a compound comprising $Y_2O_3$, $Al_2O_3$, and $ZrO_2$. The ceramic coating further comprises overlapping pancake-shaped splats and has an amorphous phase.

In one embodiment, a method of coating an article includes setting a plasma current of a plasma spray system to a value of about 100 A to about 1000 A. The method further includes positioning a torch standoff of the plasma spraying system a distance from a body between about 60 mm and about 250 mm. The method further includes flowing a first gas through the plasma spraying system at a rate of between about 30 L/min and about 400 L/min. The method further includes performing plasma spray coating to from a ceramic coating on the body, the ceramic coating having an internal compressive stress and an amorphous phase, wherein the ceramic coating comprises a compound of $Y_2O_3$, $Al_2O_3$, and $ZrO_2$, and wherein splats of the coating are have a pancake shape.

In one embodiment an article is manufactured by a process that includes placing a body comprising at least one of Al, $Al_2O_3$, AlN, $Y_2O_3$, YSZ, or SiC into a plasma spraying system (e.g., placing the article in front of a nozzle or gun of the plasma spraying system) and performing a plasma spray process by the plasma spraying system to coat at least one surface of the body with a ceramic coating composed of a compound comprising $Y_4Al_2O_9$ and a solid-solution of $Y_2O_3$—$ZrO_2$. The plasma spraying system deposits a ceramic coating made up of overlapping pancake-shaped splats. Additionally, the ceramic coating is formed directly in an amorphous phase without undergoing a phase change.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Figure 1:
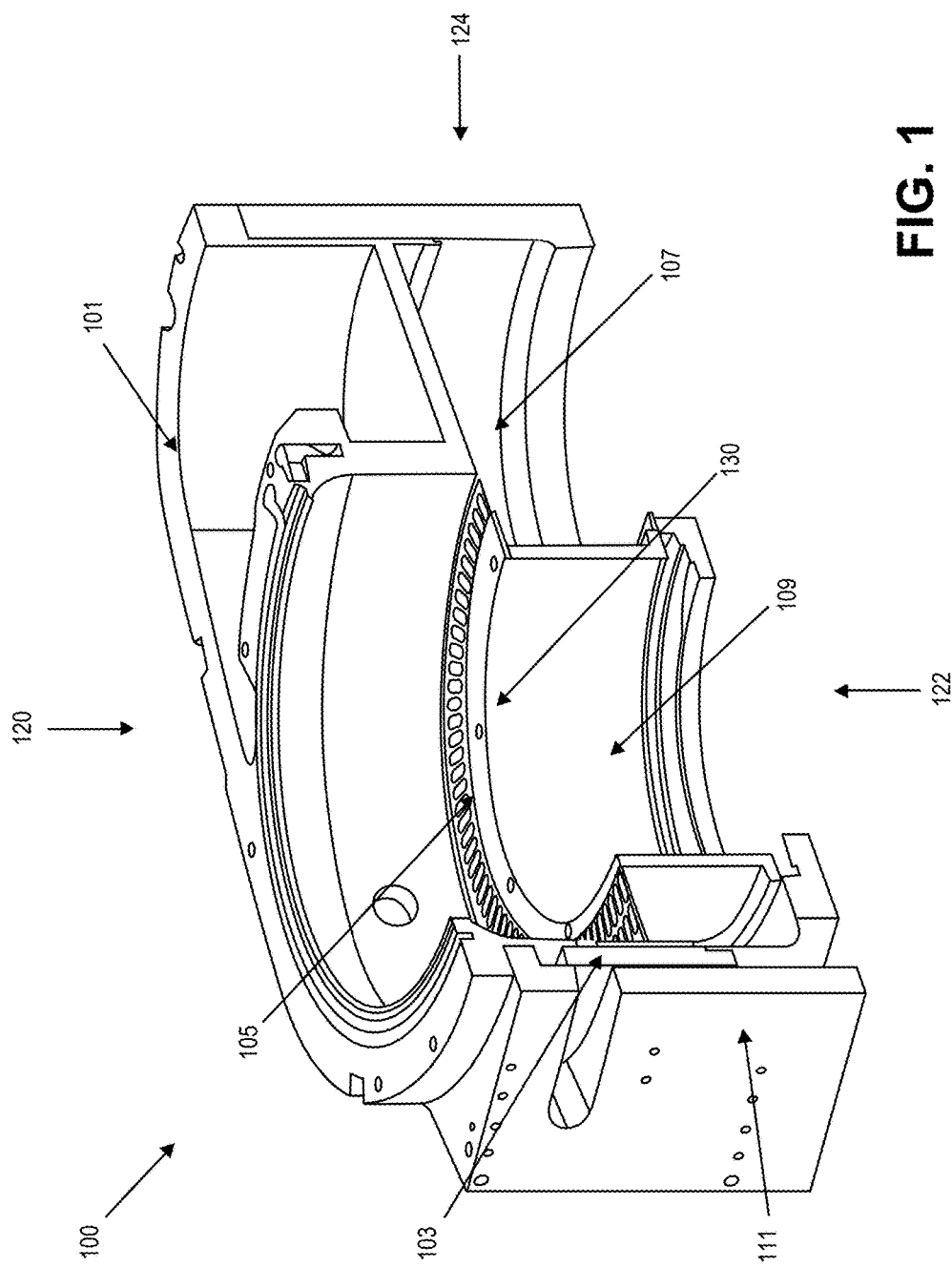
FIG. 1 illustrates a cross-sectional view of a liner kit, in accordance with one embodiment.

Embodiments of the invention are directed to an article (e.g., a plasma screen, a liner kit, showerhead, lid, electrostatic chuck, or other chamber components) exposed to plasma chemistry in a semiconductor processing chamber, and a ceramic coating on the article. A method of coating the article with the ceramic coating includes providing a plasma spraying system having a plasma current in the range of between about 100 A to about 1000 A, and positioning a torch standoff of the plasma spraying system a distance from an article between about 50 mm and about 250 mm. The method also includes flowing plasma gas (a gas that is used to produce a plasma) through the plasma spraying system at a rate of between about 30 L/min and about 400 L/min, and plasma spray coating the article with a ceramic coating. The ceramic coating includes a compound of $Y_2O_3$, $Al_2O_3$, and $ZrO_2$, and splats of the coating on the article have a pancake shape. In one embodiment, the compound is a ceramic compound comprising $Y_4Al_2O_9$ and a solid-solution of $Y_2O_3$—$ZrO_2$. By performing the plasma spray process using the provided ceramics and the provided plasma spray settings, the pancake shaped splats are created. These pancake shaped splats cause the coating to have a dense and smooth surface with built-in (internal) compressive stress. The ceramic coating can have a thickness in a range from about 2 mil to about 15 mil.

In an embodiment, the ceramic coating includes about 53 mol % $Y_2O_3$, about 10 mol % $ZrO_2$, and about 37 mol % $Al_2O_3$. The plasma current can be in a range of between about 540 A and about 560 A, and the torch standoff of the plasma spraying system can be positioned a distance from the body between about 90 mm and about 110 mm. In one embodiment, the plasma current is approximately 550 A and the distance from the body is about 100 mm. The plasma gas can flow through the plasma spraying system at a rate of between 30 L/min and about 400 L/min. In embodiments, a nozzle of the torch can have an opening with a diameter of about 6 mm, the torch can have a raster speed of about 700 m/s, and a feed rate of the powder can be about 20 g/m.

Semiconductor chamber components, such as lids, liners, and processing kits can be coated with erosion resistant plasma spray coatings. Plasma spray coatings can have built-in tensile stress that results in high porosity (e.g., greater than about 3 percent) and surface cracks that cause an unacceptably high number of on-wafer particles. Further, due to inherent porosity in the coating, chemical attack during wet cleaning can result in coating damage and/or peeling.

Coatings according to embodiments can provide dense and smooth surfaces with built-in (internal) compressive stress, which can reduce inherent porosity and cracking in the coating and improve on-wafer defect performance. Further, erosion resistance of coatings according to embodiments can be superior to standard coatings, which can increase the useful lifetime of a component with the coating. For example, lids formed of ceramic substrates with a coating according to embodiments can have reduced porosity and cracking, leading to enhanced on-wafer performance. In another example, liners formed of metal substrates with a coating according to embodiments can be more resistant to damage resulting from chemical attacks during robust wet cleaning. In yet another example, processing kit rings, which surround wafers during processing and generally have high erosion rates, with coatings according to embodiments can have smoother coatings with fewer or no cracks that enhance on-wafer particle performance.

According to embodiments, coatings can be formed by plasma spray to be smooth and dense by controlling coating phase and stress during spraying. The powder for the plasma spraying can also be formulated to be amorphous phase, rather than crystal phase, and have compressive stress during spraying. The powder materials can be formulated to easily fully melt during coating deposition. Splats of the powder can be optimized to a pancake shape without cracks or with fewer cracks by controlling the powder formulation, in addition to coating process conditions. A used herein, the term pancake-shaped refers to an approximately circular, oval or oblong shape that has a diameter (or length and width) that is many orders of magnitude larger than a thickness.

In an embodiment, the coating can be primarily amorphous phase and may develop compressive evolving stress during spraying. During coating deposition, the fully melted particles can solidify to amorphous phase without a phase change. Avoiding a phase change during solidification can reduce the incidence of cracks forming due to coating volume change. Cracks in the splats of the coating can lead to poor coating performance, including increased numbers of on-wafer particles.

According to embodiments, substrate materials can include metal, metal oxides, nitrides, carbides, and alloys of these, such as Al, $Al_2O_3$, MN, SiC, $Y_2O_3$, yttria-stabilized zirconia (YSZ), etc.

Conductor etch processes can involve plasma assisted etching of a conductive substrate such as a Si wafer by a gas mixture. As shown in FIG. 1, in conductor etch, on-wafer level particle performance is primarily correlated to chamber components such as a liner kit 100. Liner kit 100 has a front side 120, a back side 122, and an outer diameter 124, which can include a chamber body 111, an upper liner 101, a slit valve door 103, a plasma screen 105 (i.e., the grill-like structure around the wafer), a lower liner 107 and a cathode liner 109. The upper liner 101, slit valve door 103 and lower liner 107 are closer to the chamber body 111, whereas the plasma screen 105 is located around a wafer (not shown, but located at position 130 during operation) and the cathode liner 109 sits below the wafer.

A standard liner kit may be made up of an Al substrate coated with 8-12 mil of plasma sprayed $Y_2O_3$ (yttria) or other ceramic with a surface roughness of about 100-270 µin. For most typical semiconductor applications, an on-wafer particle specification is a maximum of about 30 adders (e.g., 30 stray particles located on the wafer) at greater than or equal to 90 nm particle size. A standard $Y_2O_3$ liner kit meets this on-wafer particle specification.

For specific advanced applications at 28 nm device nodes, the on-wafer particle specification is much more stringent at less than or equal to 1.3 adders at greater than or equal to 45 nm size. Moreover, these applications may use reducing chemistry ($H_2$, $CH_4$, CO, COS, etc), which often increases on-wafer particle contamination. Chamber tests using conventional $Y_2O_3$ coated liner kits under reducing chemistry show high on-wafer particles (e.g., about 50 to 100 or more adders at greater than or equal to 45 nm particle size). In some instances, significant chamber seasoning (e.g., 100 to 150 radio frequency RF hours of processing) can reduce the particle defect level down to about 0 to 10 adders at greater than or equal to 45 nm particle size to meet the production specifications before production can resume. However, long chamber seasoning times can reduce productivity. In tests, energy dispersive X-ray spectroscopy has confirmed that conventional $Y_2O_3$-based on-wafer particles may originate from the liner kit. Further, $Y_2O_3$ coatings are less stable under reducing chemistry (e.g., H2, CH4, CO, COS, etc.) and form significant Y—OH. Y—OH conversion results in volume change which results in shed particles on the wafer.

Embodiments of the present invention include a composite ceramic coating material to improve on-wafer particle performance for chamber components in semiconductor industry applications. For example, in the liner kit application, the composite ceramic coating (e.g., a Yttria based composite ceramic coating) may be applied to the plasma facing side of the liner kit using a plasma spray technique. In other embodiments, a composite ceramic coating can be applied via aerosol deposition, slurry plasma, or other suitable techniques such as other thermal spraying techniques. In one example, the coating thickness on an Aluminum liner kit can be up to 15 mil. In another example, $Al_2O_3$ or other metal oxide substrates, where the coefficient of thermal expansion (CTE) of the coating is better matched to the CTE of the substrate, can have a thicker coating.

In an embodiment, the composite ceramic coating is composed of a compound of $Y_2O_3$, $Al_2O_3$, and $ZrO_2$. For example, in an embodiment, the composite ceramic coating includes about 53 mol % $Y_2O_3$, about 10 mol % $ZrO_2$, and about 37 mol % $Al_2O_3$. In another embodiment, the composite ceramic coating can include $Y_2O_3$ in a range of 20-90 mol %, $ZrO_2$ in a range of 0-80 mol % and $Al_2O_3$ in a range of 10-70 mol %. In other embodiments, other distributions may also be used for the composite ceramic coating. In one embodiment, the composite ceramic is a yttrium oxide containing solid solution that may be mixed with one or more of $ZrO_2$, $Al_2O_3$, $HfO_2$, $Er_2O_3$, $Nd_2O_3$, $Nb_2O_5$, $CeO_2$, $Sm_2O_3$, $Yb_2O_3$, or combination thereof. In one embodiment, the compound is a ceramic compound comprising $Y_4Al_2O_9$ and a solid-solution of $Y_2O_3$—$ZrO_2$.

The composite ceramic coating may be created using a powder mixture and plasma spray parameters that produce splats with the previously described properties. These splats cause the composite ceramic coating to have a built-in compressive stress. The built-in compressive stress is an internal compressive stress that is integrated into the ceramic coating during the deposition process.

Figure 2:
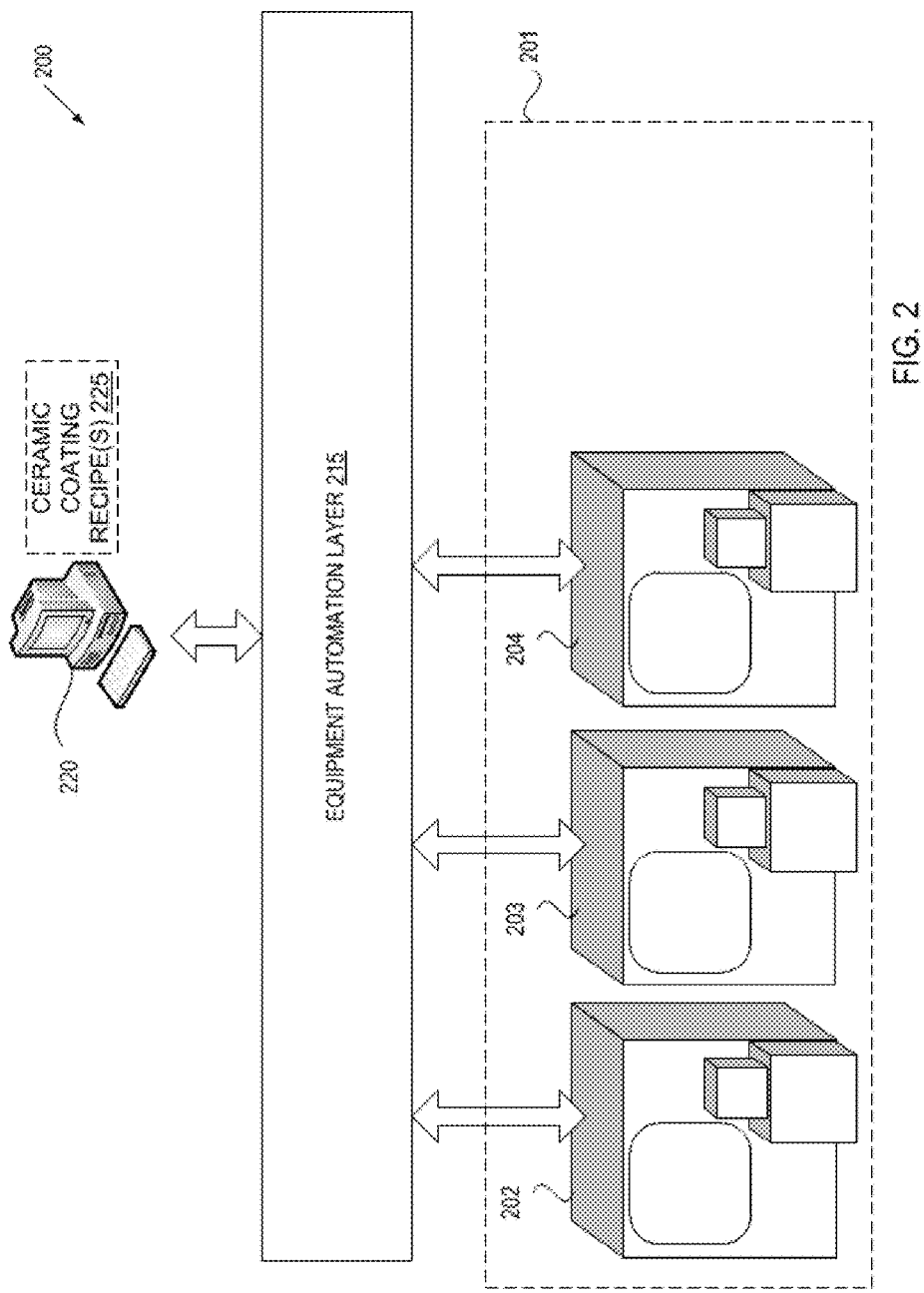
FIG. 2 illustrates an example architecture of a manufacturing system, in accordance with one embodiment.

FIG. 2 illustrates an exemplary architecture of a manufacturing system 200. The manufacturing system 200 may be a coating manufacturing system (e.g., for applying a composite ceramic coating to an article, such as a liner kit). In one embodiment, the manufacturing system 200 includes processing equipment 201 connected to an equipment automation layer 215. The processing equipment 201 may include a bead blaster 202, one or more wet cleaners 203, a plasma spray gun system 204 and/or other equipment. The manufacturing system 200 may further include one or more computing devices 220 connected to the equipment automation layer 215. In alternative embodiments, the manufacturing system 200 may include more or fewer components. For example, the manufacturing system 200 may include manually operated (e.g., off-line) processing equipment 201 without the equipment automation layer 215 or the computing device 220.

Bead blaster 202 is a machine configured to roughen or smooth the surface of articles (e.g., a liner kit). Bead blaster 202 may be a bead blasting cabinet, a hand held bead blaster, or other type of bead blaster. Bead blaster 202 may roughen a substrate by bombarding the substrate with beads or particles. In one embodiment, bead blaster 202 fires ceramic beads or particles at the substrate. The roughness achieved by the bead blaster 202 may be based on a force used to fire the beads, bead materials, bead sizes, distance of the bead blaster from the substrate, processing duration, and so forth. In one embodiment, the bead blaster uses a range of bead sizes to roughen the ceramic article.

In alternative embodiments, other types of surface rougheners than a bead blaster 202 may be used. For example, a motorized abrasive pad may be used to roughen the surface of ceramic substrates. A sander may rotate or vibrate the abrasive pad while the abrasive pad is pressed against a surface of the article. A roughness achieved by the abrasive pad may depend on an applied pressure, on a vibration or rotation rate and/or on a roughness of the abrasive pad.

Wet cleaners 203 are cleaning apparatuses that clean articles (e.g., a liner kit) using a wet clean process. Wet cleaners 203 include wet baths filled with liquids, in which the substrate is immersed to clean the substrate. Wet cleaners 203 may agitate the wet bath using ultrasonic waves during cleaning to improve a cleaning efficacy. This is referred to herein as sonicating the wet bath. In other embodiments, alternative types of cleaners such as dry cleaners may be used to clean the articles. Dry cleaners may clean articles by applying heat, by applying gas, by applying plasma, and so forth.

Ceramic coater 204 is a machine configured to apply a ceramic coating to the surface of a substrate. In one embodiment, ceramic coater 204 is a plasma sprayer (or plasma spray system) that plasma sprays a coating (e.g., a composite ceramic coating) onto the substrate (e.g., a liner kit). In alternative embodiments, the ceramic coater 204 may apply other thermal spraying techniques such as detonation spraying, wire arc spraying, high velocity oxygen fuel (HVOF) spraying, flame spraying, warm spraying and cold spraying may be used The equipment automation layer 215 may interconnect some or all of the manufacturing machines 201 with computing devices 220, with other manufacturing machines, with metrology tools and/or other devices. The equipment automation layer 215 may include a network (e.g., a location area network (LAN)), routers, gateways, servers, data stores, and so on. Manufacturing machines 201 may connect to the equipment automation layer 215 via a SEMI Equipment Communications Standard/Generic Equipment Model (SECS/GEM) interface, via an Ethernet interface, and/or via other interfaces. In one embodiment, the equipment automation layer 215 enables process data (e.g., data collected by manufacturing machines 201 during a process run) to be stored in a data store (not shown). In an alternative embodiment, the computing device 220 connects directly to one or more of the manufacturing machines 201.

In one embodiment, some or all manufacturing machines 201 include a programmable controller that can load, store and execute process recipes. The programmable controller may control temperature settings, gas and/or vacuum settings, time settings, etc. of manufacturing machines 201. The programmable controller may include a main memory (e.g., read-only memory (ROM), flash memory, dynamic random access memory (DRAM), static random access memory (SRAM), etc.), and/or a secondary memory (e.g., a data storage device such as a disk drive). The main memory and/or secondary memory may store instructions for performing heat treatment processes described herein.

The programmable controller may also include a processing device coupled to the main memory and/or secondary memory (e.g., via a bus) to execute the instructions. The processing device may be a general-purpose processing device such as a microprocessor, central processing unit, or the like. The processing device may also be a special-purpose processing device such as an application specific integrated circuit (ASIC), a field programmable gate array (FPGA), a digital signal processor (DSP), network processor, or the like. In one embodiment, programmable controller is a programmable logic controller (PLC).

In one embodiment, the manufacturing machines 201 are programmed to execute recipes that will cause the manufacturing machines to roughen a substrate, clean a substrate and/or article, coat a article and/or machine (e.g., grind or polish) a article. In one embodiment, the manufacturing machines 201 are programmed to execute recipes that perform operations of a multi-operation process for manufacturing a ceramic coated article, as described with reference to figures below. The computing device 220 may store one or more ceramic coating recipes 225 that can be downloaded to the manufacturing machines 201 to cause the manufacturing machines 201 to manufacture ceramic coated articles in accordance with embodiments of the present disclosure.

Figure 3:
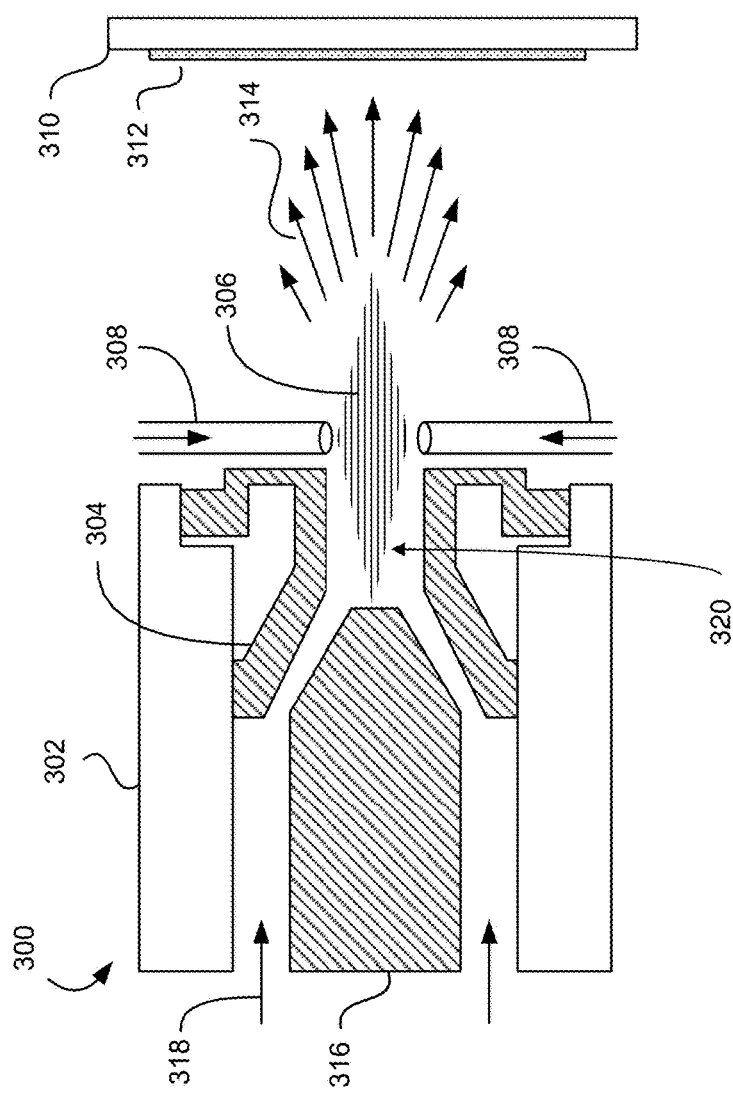
FIG. 3 illustrates a cross-sectional view of a plasma spray system, in accordance with one embodiment.

FIG. 3 illustrates a cross-sectional view of a system 300 for plasma spraying a coating on a dielectric etch component, or other article (e.g., a liner kit) used in a corrosive system. The system 300 is a type of thermal spray system. In a plasma spray system 300, an arc 306 is formed between two electrodes, an anode 304 and a cathode 316, through which a plasma gas 318 is flowing via a gas delivery tube 302. The plasma gas 318 may be a mixture of two or more gases. Examples of gas mixtures suitable for use in the plasma spray system 300 include, but are not limited to, Argon/Hydrogen, Argon/Helium, Nitrogen/Hydrogen, Nitrogen/Helium, or Argon/Oxygen. The first gas (gas before the forward-slash) represents a primary gas and the second gas (gas after the forward-slash) represents a secondary gas. A gas flow rate of the primary gas may differ from a gas flow rate of the secondary gas. In one embodiment, a gas flow rate for the primary gas is about 30 L/min and about 400 L/min. In one embodiment, a gas flow rate for the secondary gas is between about 3 L/min and about 100 L/min.

As the plasma gas is ionized and heated by the arc 306, the gas expands and is accelerated through a shaped nozzle 320, creating a high velocity plasma stream.

Powder 308 is injected into the plasma spray or torch (e.g., by a powder propellant gas) where the intense temperature melts the powder and propels the material as a stream of molten particles 314 towards the article 310. Upon impacting the article 310, the molten powder flattens, rapidly solidifies, and forms a coating 312, which adheres to the article 310. The parameters that affect the thickness, density, and roughness of the coating 312 include type of powder, powder size distribution, powder feed rate, plasma gas composition, plasma gas flow rate, energy input, torch offset distance, substrate cooling, etc. As discussed with reference to FIG. 4, these parameters are optimized to form dense plasma sprayed coatings with built in compressive stress, in accordance with embodiments.

Figure 4:
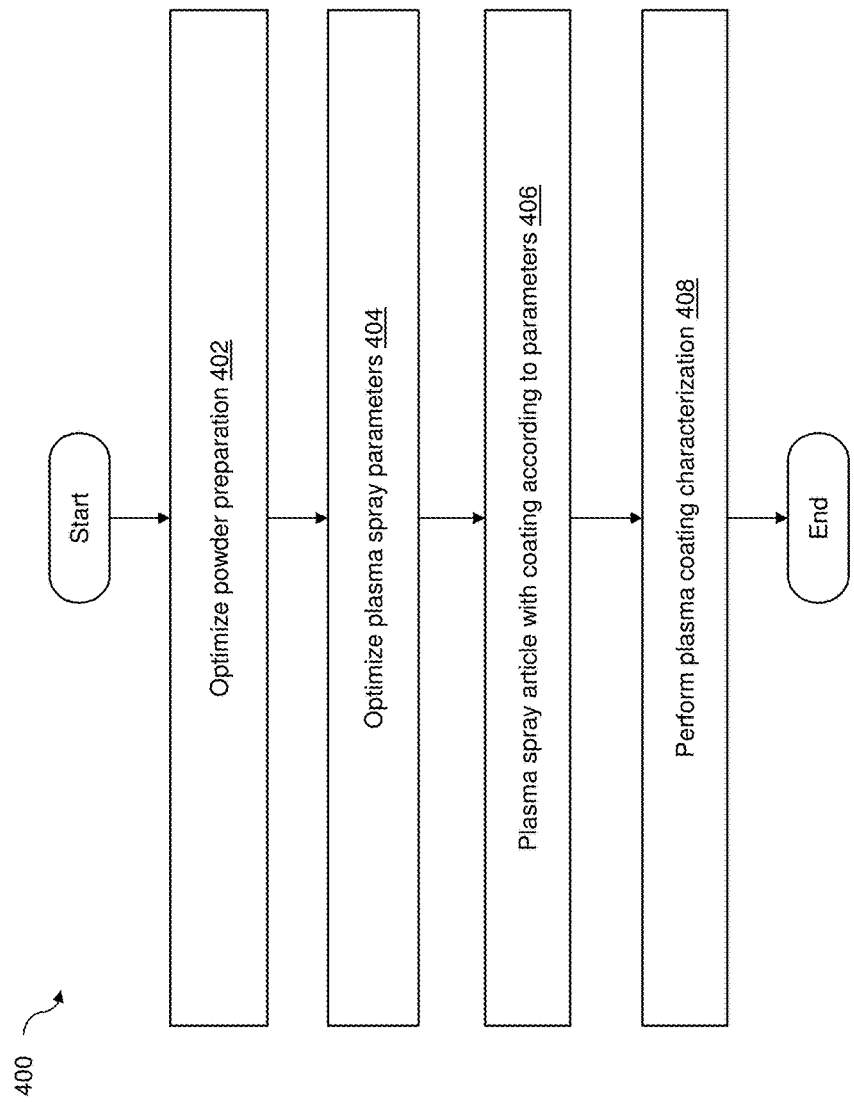
FIG. 4 illustrates a method of applying a coating to an article according to one embodiment.

FIG. 4 is a flow chart showing a process 400 for manufacturing a coated article, in accordance with an embodiment. The operations of process 400 may be performed by various manufacturing machines. The operations of process 400 will be described with reference to any article as described above, which may be used in a reactive ion etch or plasma etch system.

At block 402, the powder for plasma spraying a coating is optimized. This may include optimization of powder composition, powder shape, and powder size distribution for a composite ceramic coating. In one embodiment, optimizing a coating includes, but is not limited to, determining powder type (e.g., chemical composition), average powder size, and a powder feed rate. The powder type may be selected to produce a coating as described previously. Raw ceramic powders having specified compositions, purity and particle sizes can be selected. The ceramic powder may be formed of $Y_2O_3$, $Y_4Al_2O_9$, $Y_3Al_5O_{12}$ (YAG), or other yttria containing ceramics. Additionally, ceramic powder may be combined with one or more of $Y_2O_3$, $ZrO_2$, $Al_2O_3$, $HfO2$, $Er_2O_3$, $Nd_2O_3$, $Nb_2O_5$, $CeO_2$, $Sm_2O_3$, $Yb_2O_3$, or other oxides and/or glass powders. The raw ceramic powders are then mixed. In one embodiment, raw ceramic powders of $Y_2O_3$, $Al_2O_3$ and $ZrO_2$ are mixed together for the composite ceramic coating. In one embodiment, the powder formulation is about 53 mol % $Y_2O_3$, 37 mol % $Al_2O_3$ and 10 mol % $ZrO_2$. These raw ceramic powders may have a purity of 99.9% or greater in one embodiment. The raw ceramic powders may be mixed using, for example, ball milling. After the ceramic powders are mixed, they may be calcinated at a specified calcination time and temperature.

In one embodiment, the ceramic powder includes 62.93 molar ratio (mol %) $Y_2O_3$, 23.23 mol % $ZrO_2$ and 13.94 mol % $Al_2O_3$. In another embodiment, the ceramic powder can include $Y_2O_3$ in a range of 50-75 mol %, $ZrO_2$ in a range of 10-30 mol % and $Al_2O_3$ in a range of 10-30 mol %. In another embodiment, the ceramic powder can include $Y_2O_3$ in a range of 40-100 mol %, $ZrO_2$ in a range of 0-60 mol % and $Al_2O_3$ in a range of 0-10 mol %. In another embodiment, the ceramic powder can include $Y_2O_3$ in a range of 40-60 mol %, $ZrO_2$ in a range of 30-50 mol % and $Al_2O_3$ in a range of 10-20 mol %. In another embodiment, the ceramic powder can include $Y_2O_3$ in a range of 40-50 mol %, $ZrO_2$ in a range of 20-40 mol % and $Al_2O_3$ in a range of 20-40 mol %. In another embodiment, the ceramic powder can include $Y_2O_3$ in a range of 70-90 mol %, $ZrO_2$ in a range of 0-20 mol % and $Al_2O_3$ in a range of 10-20 mol %. In another embodiment, the ceramic powder can include $Y_2O_3$ in a range of 60-80 mol %, $ZrO_2$ in a range of 0-10 mol % and $Al_2O_3$ in a range of 20-40 mol %. In another embodiment, the ceramic powder can include $Y_2O_3$ in a range of 40-60 mol %, $ZrO_2$ in a range of 0-20 mol % and $Al_2O_3$ in a range of 30-40 mol %. In other embodiments, other distributions may also be used for the ceramic powder.

In an embodiment, the powder is optimized to maintain an amorphous phase during plasma spraying. In an example, an amorphous phase can be controlled by controlling the powder formulation. The special formulated powder can directly solidate to amorphous phase without phase change.

At block 404, the plasma spray parameters are optimized to maximize melting of the powders, reduce the number of surface nodules, increase splat surface, reduce roughness, and decrease porosity. Additionally, the plasma spray parameters are optimized to cause powder particles to become fully melted, and to cause these fully melted particles to solidify into an amorphous phase without undergoing a phase change. In embodiments, plasma spray parameters are optimized to produce pancake shape splats of material during the plasma spraying. The pancake shaped splats deposit over one another, building up many layers of pancake shaped splats that forms a ceramic coating. In one embodiment, optimizing plasma spray parameters includes, but is not limited to, determining plasma gun power and composition of spray carrier gas. Optimizing the plasma spray parameters may also include determining a particular spray coating sequence and process conditions for applying a coating (e.g., a composite ceramic coating) over a substrate (e.g., a plasma screen).

For example, Table A shows example coating process parameters to achieve pancake shaped splats during plasma spraying.

TABLE A

| Coating Process Parameters To Produce Pancake-Shaped Splats | |
|---|---|
| Parameter | Level 1 |
| Torch | F4 |
| Primary gas flow rate (L/min) | 45 Ar |
| Secondary gas flow rate (%) | 8 $H_2$ |
| Plasma current (A) | 550 |
| Torch standoff distance (mm) | 100 |
| Powder injector (g/ml) | 20 |
| Raster Speed (mm/s) | 700 |
| Nozzle Diameter (mm) | 6 |

In one embodiment, the parameters are optimized to maximize melting, reduce the number of nodules (which can indicate an increase in melting of powder), increase splat surface (which can indicate an increase in melting of powder), reduce the surface roughness, and decrease the porosity of the coating, which will decrease the on-wafer particle count because particles are less likely to become dislodged. Additionally, the parameters are optimized to cause melted particles to solidify into the amorphous phase without undergoing a phase change.

For example, an optimized plasma current can be in the range of between about 400 A to about 1000 A. A further optimized plasma current can be in the range of between about 500 A to about 800 A. In another example, an optimized positioning of a torch standoff of the plasma spraying system can be a distance from the article (e.g., liner kit or plasma screen) between about 50 mm and about 250 mm A further optimized positioning of a torch standoff can be a distance from the article between about 70 mm and about 200 mm. In yet another example, optimized gas flow through the plasma spraying system can be at a rate of between about 40 L/min and about 400 L/min A further optimized gas flow through the plasma spraying system can be at a rate of between about 50 L/min and about 300 L/min.

At block 406, the article is coated according to the selected parameters. Thermal spraying techniques and plasma spraying techniques may melt materials (e.g., ceramic powders) and spray the melted materials onto the article using the selected parameters. The ceramic powders may be fully melted during deposition, and may impact with a target body to form relatively large pancake-shaped splats on the target body. The thermally sprayed or plasma sprayed ceramic coating may be composed of a build-up of many overlapping pancake-shaped splats. Conceptually, the ceramic coating is made up of many layers of overlapping pancake shaped splats that form a single coating. The thermally sprayed or plasma sprayed ceramic coating may have a thickness about 2-15 mil. The thickness, in one example, is selected according to an erosion rate of the composite ceramic coating to ensure that the article has a useful life of at least approximately 5000 Radio Frequency Hours (RFHrs) of exposure to a plasma environment, where RFHrs is a measure of the number of hours that a component is used in processing. In other words, if the erosion rate of a composite ceramic coating is about 0.005 mil/hr, then for a useful life of about 2500 RF hours, a ceramic coating having a thickness of about 12.5 mil may be formed.

The plasma spray process may be performed in multiple spray passes. For each pass, the angle of a plasma spray nozzle may change to maintain a relative angle to a surface that is being sprayed. For example, the plasma spray nozzle may be rotated to maintain an angle of approximately 45 degrees to approximately 90 degrees with the surface of the article being sprayed.

In one embodiment, the plasma spray sequence can be optimized to achieve an improved coating (e.g., less porosity, reduced surface nodules, large pancake shaped splats, and reduced surface roughness), as well as reduce re-deposition of stray particles on to the coating surface (mostly coming from backside coating of the article).

At block 408, plasma coating characterization may be performed. This may include determining a surface morphology, a roughness, a porosity, identifying surface nodules, and so forth.

Figure 5:
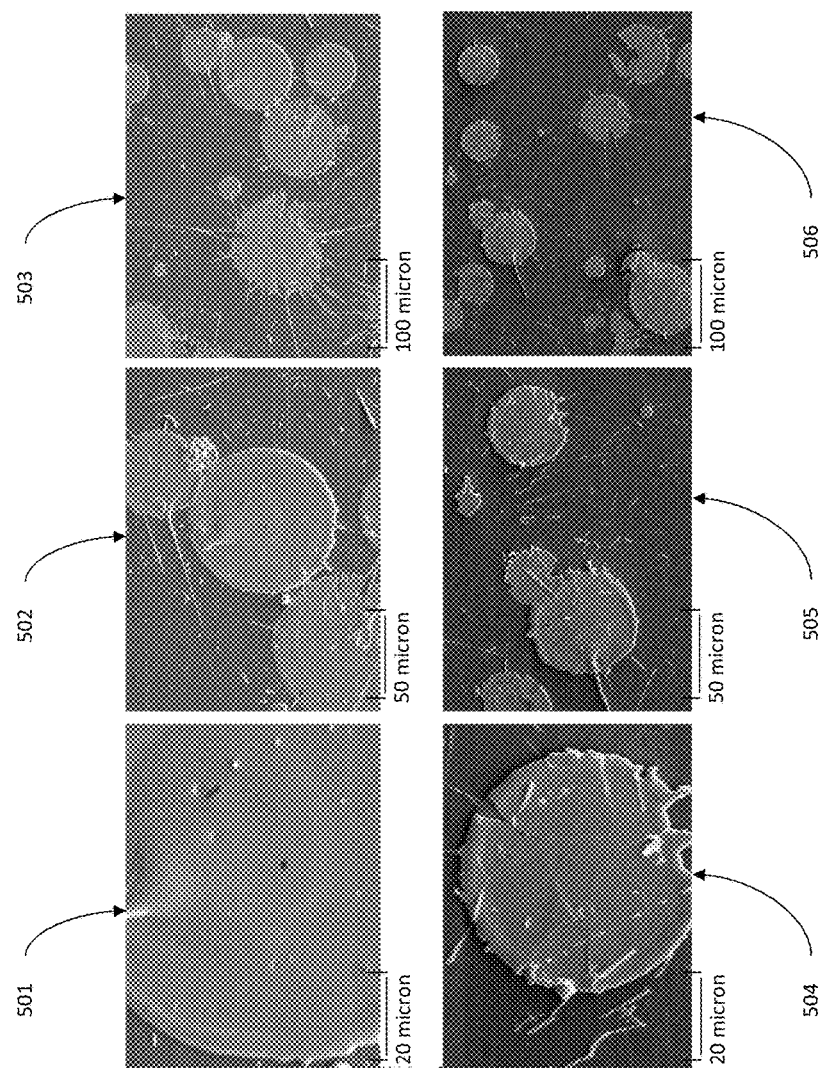
FIG. 5 illustrates scanning electron microscope (SEM) views of splat surfaces, in accordance with embodiments.

FIG. 5 shows illustrative scanning electron microscope (SEM) views of splats surfaces. View 501 shows splats of a coating on a 3000× zoom photo (e.g., a 3000× scanning electron micrograph (SEM) of a one inch sample) with a 20 micron scale. View 502 shows splats of the coating on a 1000× zoom photo (e.g., a 1000× scanning electron micrograph (SEM) of a one inch sample) with a 50 micron scale. View 503 shows splats of the coating on a 500× zoom photo (e.g., a 500× scanning electron micrograph (SEM) of a one inch sample) with a 100 micron scale, according to an embodiment where the powder formulation and plasma spraying were optimized to form pancake shaped splats without cracks for the coating. View 504 shows splats of a coating on a 3000× zoom photo (e.g., a 3000× scanning electron micrograph (SEM) of a one inch sample) with a 20 micron scale. View 505 shows splats of the coating on a 1000× zoom photo (e.g., a 1000× scanning electron micrograph (SEM) of a one inch sample) with a 50 micron scale. View 506 shows splats of the coating on a 500× zoom photo (e.g., a 500× scanning electron micrograph (SEM) of a one inch sample) with a 100 micron scale, where the powder formulation and plasma spraying were not optimized to form pancake shaped splats without cracks for the coating.

As shown in FIG. 5, views 501, 502, and 503 of a coating optimized to have pancake shaped splats show fewer or no cracks, as compared to views 504, 505, and 506 of a coating. For example, pancake shaped splats can have a disc like shape that is approximately round and flat. The splats of views 501, 502, and 503 have smoother, crack-free, rounded edges and a more disk-like appearance than the splats of views 504, 505, and 506. Evaluations of coatings formed with powder and plasma spraying optimized to form pancake shaped splats showed improved morphology and porosity as compared to coating with splats of other shapes. For example, coatings according to embodiments tend to have fewer nodules and more splats due to improved melting of the powders, decreased roughness, and decreased porosity, all of which contribute to improved on-wafer particle performance.

Figure 6:
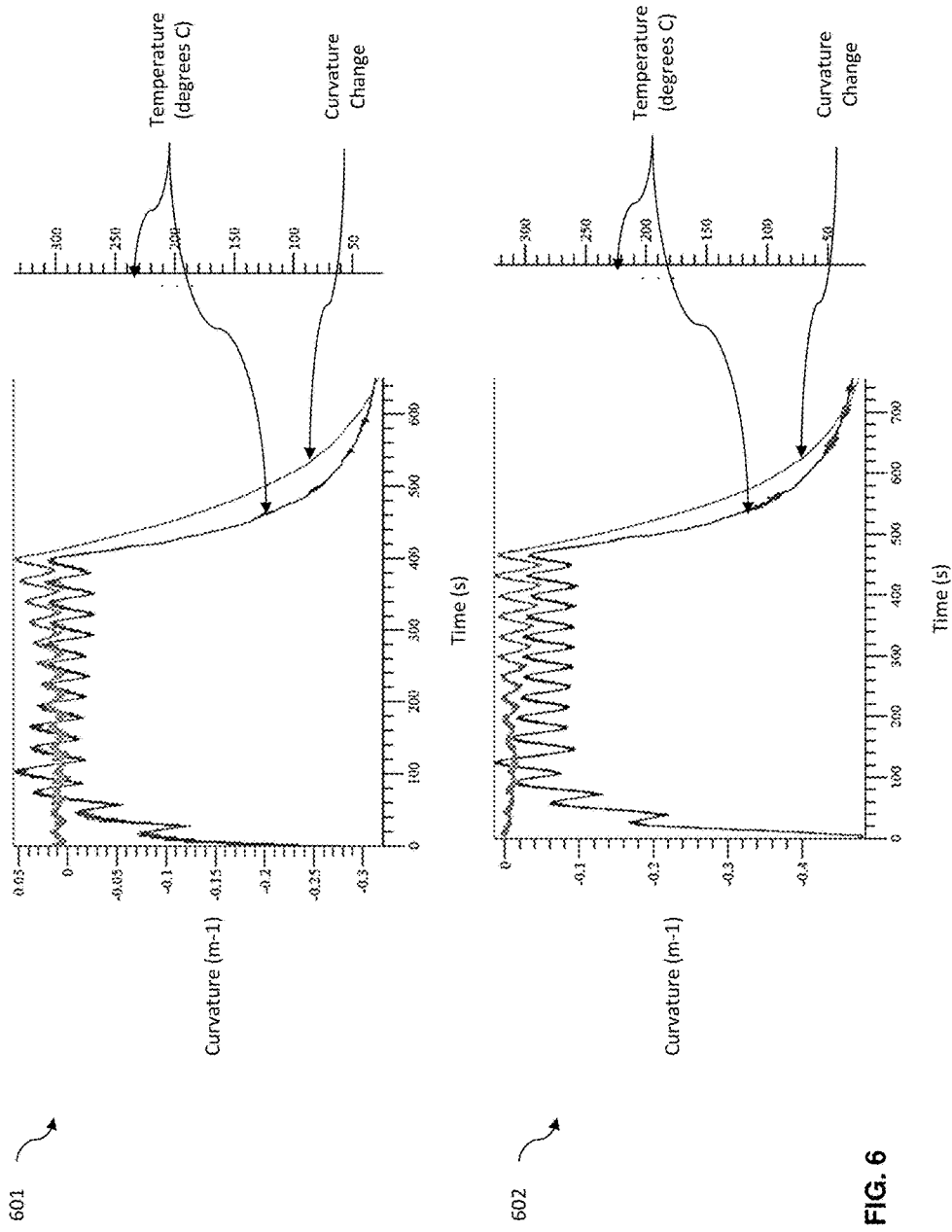
FIG. 6 illustrates curvature of coatings over time, in accordance with embodiments.

FIG. 6 illustrates in-situ curvature change of a coating during spraying, where graph 601 shows a comparative coating and graph 602 shows a coating according to an embodiment. Curvature change is an indication of stress levels in a coating during spraying. Graph 601 shows positive curvature change, which can indicate a tensile stress and can be a result of the coating generally being of a more cubic phase. Graph 602 shows negative curvature change, which can indicate a compressive stress and can be a result of the coating generally being of a more amorphous phase.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." The terms "about" and "approximately" refer to a value plus or minus 10%.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   setting, for a plasma spraying system, a plasma current to a value of about 100 A to about 1000 A;
   positioning a torch standoff of the plasma spraying system a distance from a body between about 60 mm and about 250 mm;
   flowing a first gas through the plasma spraying system at a rate of between about 30 L/min and about 400 L/min; and
   performing plasma spray coating to form a ceramic coating on the body, the ceramic coating having an internal compressive stress and an amorphous phase, wherein the ceramic coating comprises a compound of $Y_2O_3$, $Al_2O_3$, and $ZrO_2$, and wherein splats of the coating have a pancake shape, wherein the splats having the pancake shape are devoid of cracks, and wherein a pancake shape refers to an approximately circular, oval or oblong shape that has a diameter that is orders of magnitude larger than a thickness,
   wherein the ceramic coating has a composition selected from a list consisting of:
   40-100 mol % of $Y_2O_3$, above 0 to 60 mol % of $ZrO_2$, and above 0 to 10 mol % of $Al_2O_3$;
   40-60 mol % of $Y_2O_3$, 30-50 mol % of $ZrO_2$, and 10-20 mol % of $Al_2O_3$;
   40-50 mol % of $Y_2O_3$, 20-40 mol % of $ZrO_2$, and 20-40 mol % of $Al_2O_3$;
   60-80 mol % of $Y_2O_3$, above 0 to 10 mol % of $ZrO_2$, and 20-40 mol % of $Al_2O_3$;
   40-60 mol % of $Y_2O_3$, above 0 to 20 mol % of $ZrO_2$, and 30-40 mol % of $Al_2O_3$;
   30-60 mol % of $Y_2O_3$, above 0 to 20 mol % of $ZrO_2$, and 30-60 mol % of $Al_2O_3$; and
   20-40 mol % of $Y_2O_3$, 20-80 mol % of $ZrO_2$, and above 0 to 60 mol % of $Al_2O_3$.

2. The method of claim 1, wherein the ceramic coating comprises about 53 mol % $Y_2O_3$, about 10 mol % $ZrO_2$, and about 37 mol % $Al_2O_3$.

3. The method of claim 1, wherein the plasma current is in a range of between about 450 A and about 800 A.

4. The method of claim 1, wherein the torch standoff of the plasma spraying system is between about 60 mm and about 200 mm.

5. The method of claim 1, wherein the first gas is a primary gas of a gas mixture comprising a primary gas and a secondary gas, wherein the gas mixture is selected from a list comprising: a mixture of Argon and Hydrogen, a mixture of Argon and Helium, a mixture of Nitrogen and Hydrogen, a mixture of Nitrogen and Helium, and a mixture of Argon and Oxygen.

6. The method of claim 5, wherein the first gas is flowed through the plasma spraying system at a rate of between 35 L/min and about 300 L/min.

7. The method of claim 5, wherein the secondary gas is flowed through the plasma spraying system at a rate of between about 3 L/min and about 100 L/min.

8. The method of claim 1, wherein the splats solidify in the amorphous phase without undergoing a phase change.

9. The method of claim 1, wherein the plasma spraying system that performs the plasma spray coating has a nozzle diameter of about 6 mm.

10. The method of claim 1, wherein the compound of $Y_2O_3$, $Al_2O_3$, and $ZrO_2$ is a compound consisting of $Y_4Al_2O_9$ and a solid-solution of $Y_2O_3$—$ZrO_2$.

11. A method comprising:
    setting, for a plasma spraying system, a plasma current to a value of about 100 A to about 1000 A;
    positioning a torch standoff of the plasma spraying system a distance from a body between about 60 mm and about 250 mm;
    flowing a first gas through the plasma spraying system at a rate of between about 30 L/min and about 400 L/min; and
    performing plasma spray coating to form a ceramic coating on the body, wherein the performing plasma spray coating comprises formulating powder material to fully melt during coating,
    the ceramic coating having an internal compressive stress and an amorphous phase, wherein the ceramic coating comprises a compound of $Y_2O_3$, $Al_2O_3$, and $ZrO_2$, wherein splats of the coating have a pancake shape, wherein the splats having the pancake shape are devoid of cracks, and wherein a pancake shape refers to an approximately circular, oval or oblong shape that has a diameter that is orders of magnitude larger than a thickness
    wherein the ceramic coating has a composition selected from a list consisting of:
    40-100 mol % of $Y_2O_3$, above 0 to 60 mol % of $ZrO_2$, and above 0 to 10 mol % of $Al_2O_3$;
    40-60 mol % of $Y_2O_3$, 30-50 mol % of $ZrO_2$, and 10-20 mol % of $Al_2O_3$;
    40-50 mol % of $Y_2O_3$, 20-40 mol % of $ZrO_2$, and 20-40 mol % of $Al_2O_3$;
    60-80 mol % of $Y_2O_3$, above 0 to 10 mol % of $ZrO_2$, and 20-40 mol % of $Al_2O_3$;
    40-60 mol % of $Y_2O_3$, above 0 to 20 mol % of $ZrO_2$, and 30-40 mol % of $Al_2O_3$;
    30-60 mol % of $Y_2O_3$, above 0 to 20 mol % of $ZrO_2$, and 30-60 mol % of $Al_2O_3$; and
    20-40 mol % of $Y_2O_3$, 20-80 mol % of $ZrO_2$, and above 0 to 60 mol % of $Al_2O_3$.

12. A method comprising:
    setting, for a plasma spraying system, a plasma current to a value of about 100 A to about 1000 A;
    positioning a torch standoff of the plasma spraying system a distance from a body between about 60 mm and about 250 mm;
    flowing a first gas through the plasma spraying system at a rate of between about 30 L/min and about 400 L/min; and
    performing plasma spray coating to form a ceramic coating on the body, the ceramic coating having an internal compressive stress and an amorphous phase, wherein the ceramic coating comprises a compound of $Y_2O_3$, $Al_2O_3$, and $ZrO_2$, and wherein splats of the coating have a pancake shape, wherein the splats having the pancake shape are devoid of cracks, and wherein a pancake shape refers to an approximately circular, oval or oblong shape that has a diameter that is orders of magnitude larger than a thickness,
    wherein the plasma spraying system that performs the plasma spray coating has a nozzle diameter of about 6 mm.

* * * * *